US010304247B2

(12) United States Patent
King

(10) Patent No.: US 10,304,247 B2
(45) Date of Patent: May 28, 2019

(54) THIRD PARTY HOLOGRAPHIC PORTAL

(71) Applicant: Microsoft Technology Licensing, LLC, Redmond, WA (US)

(72) Inventor: Jeffrey Benjamin Dvorsky King, Burnaby (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/964,312

(22) Filed: Dec. 9, 2015

(65) Prior Publication Data

US 2017/0169610 A1 Jun. 15, 2017

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G03H 1/0005* (2013.01);
(Continued)

(58) Field of Classification Search
CPC ......... G06T 19/006; G06T 3/40; G06T 17/00; G06T 19/003; G02B 27/017; G03H 1/0005; G06Q 50/00; G06Q 50/01; G06Q 30/0641; G06Q 10/00; G06Q 10/109; G06Q 10/1095; H04N 7/15; H04N 7/157; H04N 21/2187; G06F 3/01; G06F 3/012;
(Continued)

(56) References Cited

U.S. PATENT DOCUMENTS 6,774,869 B2 8/2004 Biocca et al.
8,134,553 B2 3/2012 Saini et al.
(Continued)

FOREIGN PATENT DOCUMENTS

CN 102592315 A 7/2012

OTHER PUBLICATIONS

Abate, et al., "3D modeling and remote rendering technique of a high definition cultural heritage artefact", In Proceedings of First World Conference on Information Technology, Oct. 6, 2010, pp. 848-852.
(Continued)

Primary Examiner — Xilin Guo
(74) Attorney, Agent, or Firm — Alleman Hall Creasman & Tuttle LLP

(57) ABSTRACT

A method for displaying via a head-mounted display device a third party holographic portal in a user real world environment is disclosed. The method may include receiving a permission specifying a condition under which a third party is authorized to display the holographic portal in the user real world environment. A request may be received from the third party to display the third party holographic portal in the user real world environment. If the condition is satisfied and in response to the request, the head-mounted display device may display the holographic portal in the user real world environment, with the holographic portal comprising a visual representation of activity in a third party real world environment that is associated with the third party.

16 Claims, 9 Drawing Sheets

(51) Int. Cl.
*G06Q 50/00* (2012.01)
*H04N 7/15* (2006.01)
*G02B 27/01* (2006.01)
*G03H 1/00* (2006.01)
*G06T 3/40* (2006.01)
*H04N 7/14* (2006.01)

(52) U.S. Cl.
CPC .............. *G06F 3/011* (2013.01); *G06F 3/012* (2013.01); *G06Q 50/01* (2013.01); *G06T 3/40* (2013.01); *H04N 7/142* (2013.01); *H04N 7/157* (2013.01)

(58) Field of Classification Search
CPC .............. G06F 3/0412; G06F 3/04842; G06F 3/04847; G06F 19/3418; G06F 17/30017; G06F 17/30058; G06F 17/30852; G06F 1/163; G06F 17/30241; G06F 17/30528; G06F 3/0481; G06F 3/011; G06F 21/31; H04L 51/04; H04L 51/16; H04L 63/0442; H04L 63/20; H04L 67/22; H04L 12/18; H04L 43/04; H04L 63/083; H04L 67/10; H04L 51/02; H04L 67/306
See application file for complete search history.

(56) References Cited

U.S. PATENT DOCUMENTS

| | | | |
|---|---|---|---|
| 8,479,110 | B2 | 7/2013 | Johnson et al. |
| 8,553,965 | B2 | 10/2013 | Zhao et al. |
| 8,572,177 | B2 | 10/2013 | Goldman et al. |
| 8,587,601 | B1 | 11/2013 | Kahn et al. |
| 8,595,299 | B1 | 11/2013 | Wang et al. |
| 8,683,386 | B2 | 3/2014 | Shuster |
| 8,814,691 | B2 | 8/2014 | Haddick et al. |
| 8,832,233 | B1* | 9/2014 | Brin .................. H04L 29/06476 709/203 |
| 8,930,844 | B2 | 1/2015 | Carlin |
| 8,966,356 | B1 | 2/2015 | Hickman et al. |
| 9,041,739 | B2 | 5/2015 | Latta et al. |
| 9,459,454 | B1* | 10/2016 | The ...................... G02B 27/017 |
| 2006/0021009 | A1 | 1/2006 | Lunt |
| 2009/0254843 | A1* | 10/2009 | Van Wie ............. H04L 12/1822 715/757 |
| 2010/0017728 | A1 | 1/2010 | Cho et al. |
| 2010/0164990 | A1 | 7/2010 | Van Doorn |
| 2010/0222040 | A1 | 9/2010 | Bosan et al. |
| 2012/0249416 | A1 | 10/2012 | Maciocci et al. |
| 2013/0271457 | A1 | 10/2013 | Haswell et al. |
| 2013/0278631 | A1 | 10/2013 | Border et al. |
| 2013/0342564 | A1* | 12/2013 | Kinnebrew ............ G09G 3/003 345/619 |
| 2013/0342571 | A1 | 12/2013 | Kinnebrew et al. |
| 2014/0002442 | A1 | 1/2014 | Lamb et al. |
| 2014/0002444 | A1 | 1/2014 | Bennett et al. |
| 2014/0047385 | A1 | 2/2014 | Ruble et al. |
| 2014/0063060 | A1 | 3/2014 | Maciocci et al. |
| 2014/0152558 | A1 | 6/2014 | Salter et al. |
| 2014/0160157 | A1 | 6/2014 | Poulos et al. |
| 2014/0184602 | A1 | 7/2014 | Tuffreau et al. |
| 2014/0204117 | A1 | 7/2014 | Kinnebrew et al. |
| 2014/0282008 | A1 | 9/2014 | Verard et al. |
| 2014/0306993 | A1 | 10/2014 | Poulos et al. |
| 2014/0316920 | A1* | 10/2014 | Wolfe ................... G06Q 20/12 705/26.1 |
| 2014/0364215 | A1 | 12/2014 | Mikhailov et al. |
| 2015/0091891 | A1 | 4/2015 | Raheman et al. |
| 2015/0180746 | A1* | 6/2015 | Day, II ................... H04L 51/16 455/405 |
| 2015/0317832 | A1* | 11/2015 | Ebstyne ................. G06F 3/011 345/633 |
| 2016/0306172 | A1* | 10/2016 | Chestnut ............ G02B 27/0172 |
| 2017/0032729 | A1* | 2/2017 | Moldvai ............ G02B 27/0172 |
| 2017/0243490 | A1* | 8/2017 | Leppanen ................ B60Q 1/50 |

OTHER PUBLICATIONS

"X-ISS Creates Affordable, Efficient Remote 3D Visualization Solution", Retrieved on: Sep. 16, 2015 Available at: http://www.x-iss.com/case-studies/x-iss-creates-affordable-efficient-remote-3d-visualization-solution/.

Goldberg, et al., "Digimuse: An interactive telerobotic system for remote viewing of three-dimensional art objects", In Proceedings of SPIE 3524, Telemanipulator and Telepresence Technologies V, Dec. 18, 1998, 5 pages.

Forte, et al., "Cyberarchaeology: Experimenting with teleimmersive archaeology", In Proceedings of 16th International Conference on Virtual Systems and Multimedia, Oct. 20, 2010, pp. 155-162.

Welch, et al., "Remote 3D Medical Consultation", In Proceedings of 2nd International Conference on Broadband Networks, Oct. 7, 2005, pp. 103-110.

Takahashi, et al., "Real Time 3D Avatar Transmission using Cylinder Mapping", In Proceedings of IEEE International Conference on Acoustics, Speech and Signal Processing, Apr. 15, 2007, 4 pages.

"Interactive 3D Content Sharing", Retrieved on: Oct. 7, 2015 Available at: http://ieeexplore.ieee.org/stamp/stamp.jsp?arnumber=5720683.

Hartl, et al., "Rapid Reconstruction of Small Objects on Mobile Phones", In Proceedings of IEEE Computer Society Conference on Computer Vision and Pattern Recognition Workshops, Jun. 20, 2011, pp. 20-27.

Jones, et al., "IllumiRoom: Peripheral Projected Illusions for Interactive Experiences", In Proceedings of ACM SIGCHI Conference on Human Factors in Computing Systems, Apr. 27, 2013, 10 pages.

"The Era of Holographic Computing is Here," Microsoft HoloLens Website, Available Online at http://www.microsoft.com/microsoft-hololens/en-us, Jan. 21, 2015, 11 pages.

Wassom, B., "'Augmented Reality' by Any Other Name: Still as Sweet?," Wassom.com Website, Available Online at http://www.wassom.com/augmented-reality-by-any-other-name-still-as-sweet.html, Mar. 6, 2015, 3 pages.

ISA European Patent Office, International Search Report and Written Opinion Issued in PCT Application No. PCT/US2016/063745, dated Feb. 10, 2017, WIPO, 13 Pages.

"Second Written Opinion Issued in PCT Application No. PCT/US2016/063745", dated Jul. 31, 2017, 7 Pages.

"International Preliminary Report on Patentability Issued in PCT Application No. PCT/US2016/063745", dated Nov. 9, 2017, 8 Pages.

* cited by examiner

THIRD PARTY HOLOGRAPHIC PORTAL

BACKGROUND

As personal mobility and the pace of life continue to grow, people increasingly use technology to connect with others. A person may electronically share portions of his or her life with one or more other people. Recipients may appreciate receiving such communications from selected persons.

SUMMARY

A head-mounted display device and methods for displaying a third party holographic portal are disclosed herein. In one example, a head-mounted display device comprises an at least partially see-through display a processor, and a memory. The memory holds instructions executable by the processor to receive from a user a permission specifying a condition under which a third party is authorized to cause the head-mounted display device to display a third party holographic portal in a user real world three dimensional environment.

A request is received from the third party to display the third party holographic portal in the user real world three dimensional environment. If the condition is satisfied and in response to the request, the third party holographic portal is displayed in the user real world three dimensional environment via the head-mounted display, wherein the third party holographic portal comprises a visual representation of activity in a third party real world three dimensional environment that is associated with the third party.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present descriptions relate to displaying a third party holographic portal via a head-mounted display device in a user real world three dimensional environment. The third party holographic portal may comprise a visual representation of activity in a third party real world three dimensional environment that is associated with a third party. As described in more detail below, in some examples image data may be transmitted to the head-mounted display device to cause the device to display the third party holographic portal in a user's real world three dimensional environment.

Figure 1:
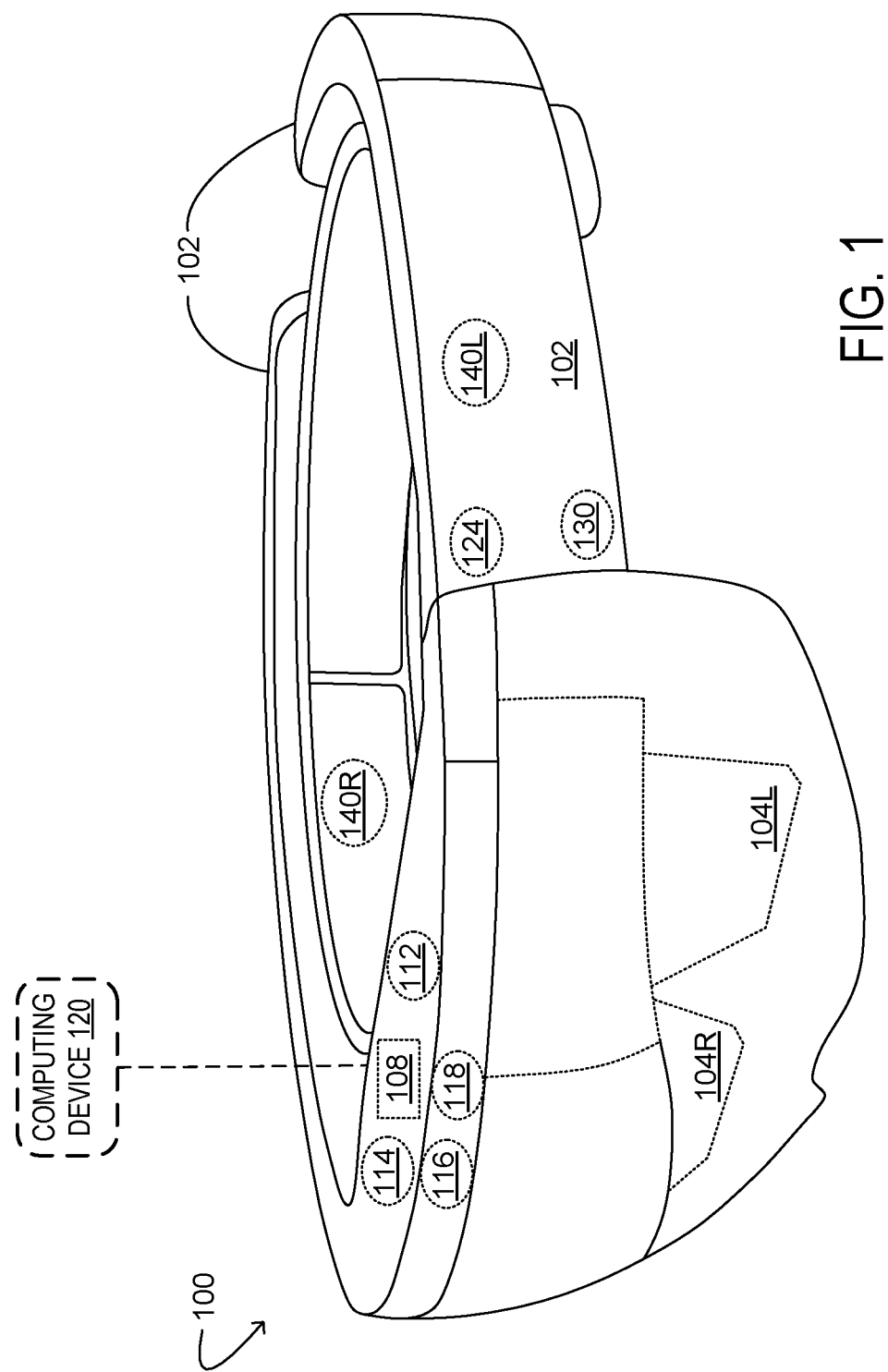
FIG. 1 shows a head-mounted display device for displaying a third party holographic portal according to an example of the present description.

In some examples, the display device may comprise an HMD device, such as an augmented reality display device that includes an at least partially see-through display configured to visually augment a view of a real world three dimensional environment through the display. FIG. 1 illustrates an HMD device 100 that may be worn by a user according to an example of the present disclosure. In other examples an HMD device may take any other suitable form in which an at least partially see-through display is supported in front of a viewer's eye or eyes.

In the example of FIG. 1, the HMD device 100 includes a frame 102 that wraps around the head of a user to position at least partially see-through right display panel 104R and at least partially see-through left display panel 104L close to the user's eyes. The frame supports additional stereoscopic, see-through display componentry as described in more detail below. HMD device 100 may be used in augmented-reality applications, where virtual display imagery is mixed with real-world imagery.

In this example HMD device 100 includes separate right and left display panels, 104R and 104L, which may be wholly or partially transparent from the perspective of the user, to give the user a clear view of his or her surroundings. A processor 108 is operatively coupled to the display panels 104R and 104L and to other display-system componentry. The processor 108 includes logic and associated computer memory configured to provide image signals to the display panels 104R and 104L, to receive sensory signals, and to enact various control processes described herein.

The display panels 104R and 104L facilitate the delivery of holographic images to the eyes of a wearer of the HMD device 100. In this manner, the display panels 104R and 104L may be configured to visually augment an appearance of a real-world, three dimensional physical environment to a wearer viewing the physical environment through the panels.

Any suitable display technology and configuration may be used to display images via the at least partially see-through display panels 104R and 104L. For example, the panels may be configured to enable a wearer of the HMD device 100 to view a physical, real-world object in the physical environment through one or more partially transparent pixels that are displaying a virtual object representation. For example, the panels may include image-producing elements such as, for example, a see-through Organic Light-Emitting Diode (OLED) display.

As another example, the HMD device 100 may include a light modulator on an edge of the panels. In this example, the panels may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment. In other examples, the display panels may utilize a liquid crystal on silicon (LCOS) display. Additionally, while the example of FIG. 1 shows separate right and left display panels 104R and 104L, a single display panel extending over both eyes may be used in other examples.

The HMD device 100 may also include various sensors and related systems to provide information to the processor 108. Such sensors may include, but are not limited to, one or more inward facing image sensors 112, 114, one or more outward facing image sensors 116, 118, an inertial measurement unit (IMU) 124, and one or more microphones 130. The HMD device 100 may also include stereo loudspeakers 140R and 140L to broadcast audio to the wearer. The one or more inward facing image sensors 112, 114 may be configured to acquire image data in the form of gaze tracking data from a wearer's eyes (e.g., sensor 112 may acquire image data from one of the wearer's eyes, and sensor 114 may acquire image data from the other of the wearer's eye).

The processor 108 may execute instructions to determine gaze directions of each of a wearer's eyes in any suitable manner based on the information received from the image sensors 112, 114. For example, one or more light sources, such as infrared light sources, may be configured to cause a glint of light to reflect from the cornea of each eye of a wearer. The one or more image sensors 112, 114 may be configured to capture an image of the wearer's eyes. Images of the glints and of the pupils as determined from image data gathered from the image sensors may be used to determine an optical axis of each eye.

Using this information, the processor 108 may execute instructions to determine a direction in which the wearer is gazing. The processor 108 also may execute instructions to determine a location at which the wearer is gazing and/or an identity of a physical and/or virtual object at which the wearer is gazing by projecting the user's gaze vector onto a 3D model of the surrounding environment. The one or more light sources and the one or more inward facing image sensors 112, 114 may collectively represent a gaze sensor configured to measure one or more gaze parameters of the user's eyes.

In other implementations, a different type of gaze sensor may be employed in the HMD device 100 to measure one or more gaze parameters of the user's eyes. Examples of gaze parameters measured by one or more gaze sensors may include an eye gaze direction or gaze vector, head orientation, eye gaze velocity, eye gaze acceleration, change in angle of eye gaze direction, and/or any other suitable tracking information. In some implementations, eye gaze tracking may be recorded independently for both eyes of the wearer of the HMD device 100.

The one or more outward facing image sensors 116, 118 may be configured to measure physical environment attributes of the physical environment in which the HMD device 100 is located (e.g., light intensity). In one example, image sensor 116 may include a visible-light camera configured to collect a visible-light image of a physical space. Further, the image sensor 118 may include a depth camera configured to collect a depth image of a physical space. More particularly, in one example the depth camera is an infrared time-of-flight depth camera. In another example, the depth camera is an infrared structured light depth camera.

Data from the outward facing image sensors 116, 118 may be used by the processor 108 to detect movements within a field of view of the HMD device 100, such as gesture-based inputs or other movements performed by a wearer or by a person or physical object within the field of view. In one example, data from the outward facing image sensors 116, 118 may be used to detect user input performed by the wearer of the HMD device 100, such as a gesture (e.g., a pinching of fingers, closing of a fist, pointing with a finger or hand, etc.), that indicates an action to be taken, a selection of a hologram or other virtual object displayed on the display device, or other command.

Data from the outward facing image sensors 116, 118 also may be used by the processor 108 to determine direction/location and orientation data (e.g., from imaging environmental features) that enables position/motion tracking of the HMD device 100 in the real world three dimensional environment. In some examples such position/motion tracking may be performed with respect to a real world object, such as a structure or portion of a structure. Data from the outward facing image sensors 116, 118 may be used by the processor 108 to construct still images and/or video images of the surrounding environment from the perspective of the HMD device 100.

Data from the outward facing image sensors 116, 118 may be used by the processor 108 to identify surfaces of a physical space. As such, the outward facing image sensors 116, 118 may be referred to as surface sensors configured to measure one or more surface parameters of the physical space.

The processor 108 may execute instructions to identify surfaces of the physical space in any suitable manner. In one example, surfaces of the physical space may be identified based on depth maps derived from depth data provide by the depth camera of image sensor 118. In another example, the processor 108 may execute instructions to generate or update a three-dimensional model of the physical space using information from outward facing image sensors 116, 118.

Additionally or alternatively, information from outward facing image sensors 116, 118 may be communicated to a remote computing device 120 responsible for generating and/or updating a model of the physical space. The HMD device 10 may be communicatively coupled to one or more other devices via a wired connection or a wireless connection to a network. In some examples, the network may take the form of a local area network (LAN), wide area network (WAN), wired network, wireless network, personal area network, or a combination thereof, and may include the Internet.

Computing device 120 may take the form of a server, networking computer, gaming console, mobile communication device, wearable computing device, desktop computer, laptop computer, tablet computer, set-top box (e.g. cable television box, satellite television box), or any other type of suitable computing device. In some examples, computing device 120 may comprise an embedded system within a larger electronic or mechanical device or system. Additional details regarding the components and computing aspects of the computing device 120 are described in more detail below with respect to FIG. 8.

The relative position and/or orientation of the HMD device 100 relative to the physical space may be assessed so that augmented-reality images may be accurately displayed in desired real-world locations with desired orientations. In particular, the processor 108 may execute instructions to generate a 3D model of the physical space including surface reconstruction information that may be used to identify surfaces in the physical space.

The IMU 124 may be configured to provide position and/or orientation data of the HMD device 100 to the processor 108. In one implementation, the IMU 124 may be configured as a three-axis or three-degree of freedom (3DOF) position sensor system. This example position sensor system may, for example, include three gyroscopes to indicate or measure a change in orientation of the HMD 100 within 3D space about three orthogonal axes (e.g., roll, pitch, and yaw). The orientation derived from the sensor signals of the IMU may be used to display, via the see-through display, one or more holographic images with a realistic and stable position and orientation.

In another example, the IMU 124 may be configured as a six-axis or six-degree of freedom (6DOF) position sensor system. Such a configuration may include three accelerometers and three gyroscopes to indicate or measure a change in location of the HMD device 100 along three orthogonal spatial axes (e.g., x, y, and z) and a change in device orientation about three orthogonal rotation axes (e.g., yaw, pitch, and roll). In some implementations, position and orientation data from the outward facing image sensors 116, 118 and the IMU 124 may be used in conjunction to determine a position and orientation (or 6DOF pose) of the HMD device 100.

In some examples, a 6DOF position sensor system may be used to display holographic representations in a world-locked manner. A world-locked holographic representation appears to be fixed relative to real world objects viewable through the HMD device 100, thereby enabling a wearer of the HMD device 100 to move around a real world physical environment while perceiving a world-locked hologram as remaining stationary in a fixed location and orientation in the physical environment.

In other examples, the HMD device 100 may operate in a body-lock display mode in which one or more holographic objects may be displayed via the HMD device with body-locked positions. In a body-locked position, a holographic object appears to be fixed relative to the wearer of the HMD device 100, and the body-locked position of the holographic object appears to be moveable relative to real-world objects.

Optical sensor information received from the outward facing image sensors 116, 118 and/or position sensor information received from IMU 124 may be used to assess a position and orientation of the vantage point of the HMD device 100 relative to other real world physical objects. In some embodiments, the position and orientation of the vantage point may be characterized with six degrees of freedom (e.g., world-space X, Y, Z, pitch, roll, yaw). The vantage point may be characterized globally or independently of the real world background.

The HMD device 100 may also support other suitable positioning techniques, such as GPS or other global navigation systems. Further, while specific examples of position sensor systems have been described, it will be appreciated that any other suitable sensor systems may be used. For example, head position or pose and/or movement data may be determined based on sensor information from any combination of sensors mounted on the HMD device 100 and/or external to the device including, but not limited to, any number of gyroscopes, accelerometers, inertial measurement units, GPS devices, magnetometers, cameras (e.g., visible light cameras, infrared light cameras, time-of-flight depth cameras, structured light depth cameras, etc.), communication devices (e.g., WIFI antennas/interfaces), etc.

The processor 108 may include a logic processor and the HMD device 100 may include volatile memory and non-volatile storage, as discussed in more detail below with respect to FIG. 8, in communication with the at least the partially see-through panels and various sensors of the HMD device 100.

Figure 2:
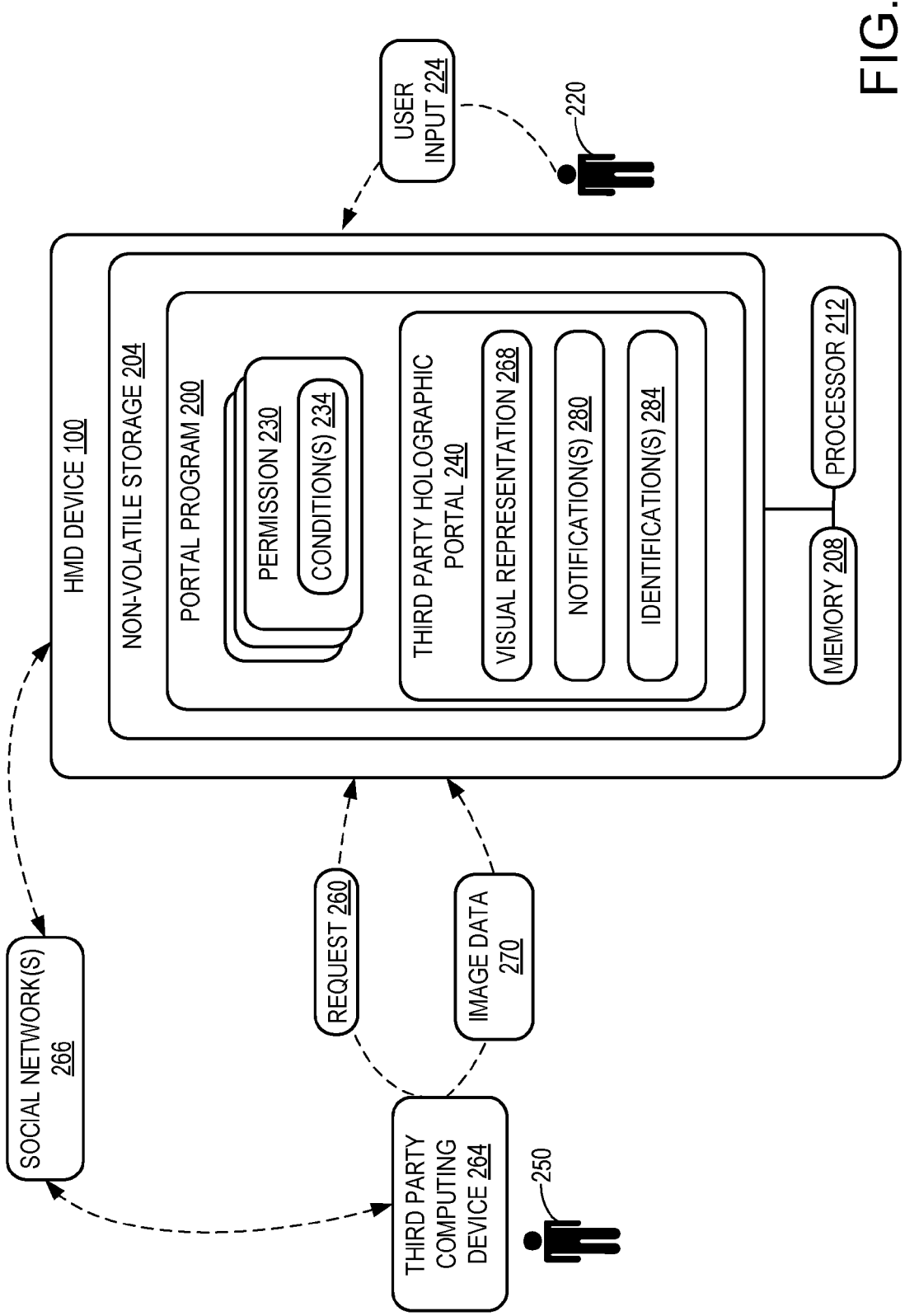
FIG. 2 is a schematic view of the head-mounted display device of FIG. 1 according to an example of the present description.

With reference now to FIGS. 2-7, example use cases illustrating aspects of the present disclosure will now be presented. As schematically shown in FIG. 2, the HMD device 100 may comprise a portal program 200 stored in non-volatile storage 204. The portal program 200 may be loaded into memory 208 and its instructions executed by processor 212 to perform one or more of the methods and processes for displaying a third party holographic portal described herein.

Figure 3:
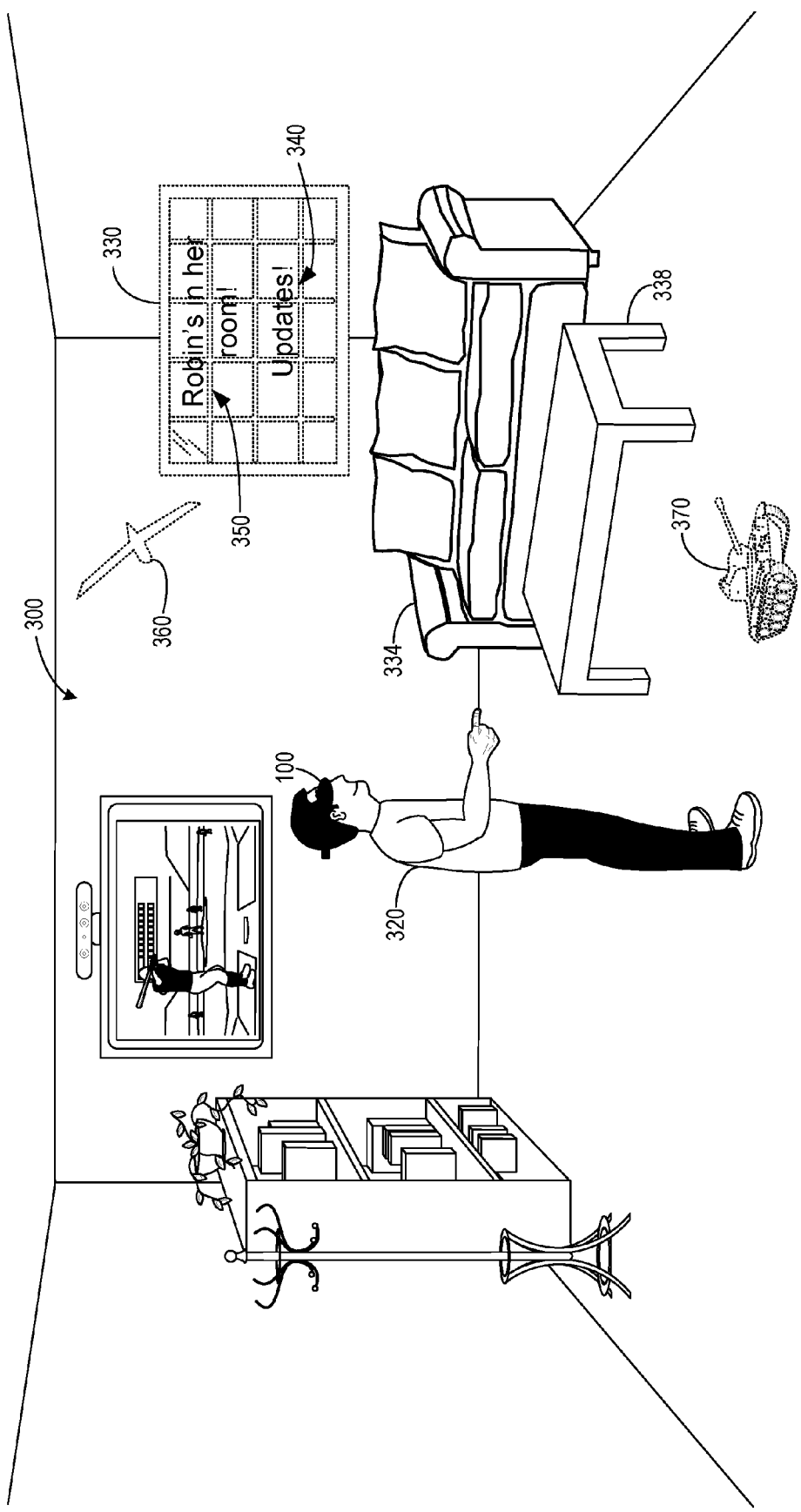
FIG. 3 shows a user wearing the head-mounted display device of FIG. 1 in a user real world three dimensional environment according to an example of the present description.

In some examples a user 220 of HMD device 100 may provide user input 224 to the HMD device 100 comprising one or more permissions 230. The one or more permissions 230 may specify one or more conditions 234 under which a third party is authorized to cause the HMD device 100 to display a third party holographic portal 240 in a user real world three dimensional environment. With reference now to FIG. 3, in one example a user Adam 320 may be standing in his living room 300 and may wear the HMD device 100 as shown in FIGS. 1 and 2 and described above. As noted above, HMD device 100 may comprise an at least partially see-through display configured to visually augment the view of user Adam 320 through the display of the real world three dimensional environment of his living room 300.

As schematically illustrated in FIG. 2, a third party 250 may transmit a request 260 from a third party computing device 264 to display via the HMD device 100 a third party holographic portal 240 in the user real world three dimensional environment, such as Adam's living room 300. For example and with reference also to FIG. 4, Adam's friend Robin 420 may use her HMD device 410 to send a request 260 to Adam's HMD device 100. In other examples, Robin 420 may send a request 260 via another third party computing device, such as set-top computing device 424, video camera 438, or any other suitable computing device.

Upon receipt of a request 260, the portal program 200 may determine if the condition 234 of permission 230 is satisfied by the request. For example, user Adam 320 may input a permission specifying that a third party is authorized to cause Adam's HMD device 100 to display a third party holographic portal in Adam's living room 300 if the third party is linked to Adam on one or more social networks 266, such as either Social Network A or Social Network B.

In other examples, user Adam 320 may input a permission specifying a condition that the third party is listed in an authorization list that identifies selected third parties who may display their holographic portals in Adam's living room 300. In other examples, various combinations of the foregoing permissions and other permissions also may be utilized.

Figure 4:
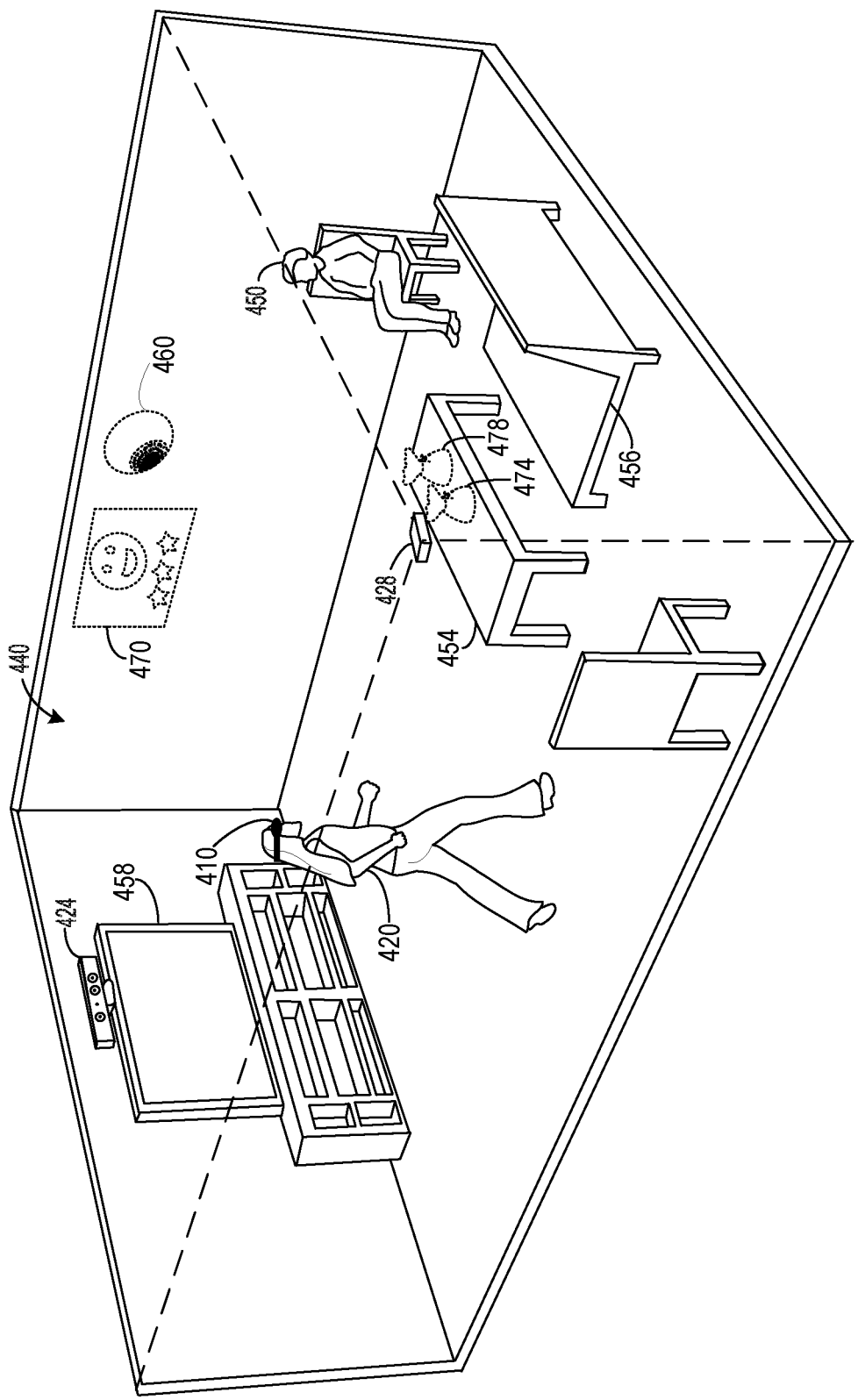
FIG. 4 shows a third party real world three dimensional environment associated with a third party according to an example of the present description.

In the present example, if friend Robin 420 is linked to user Adam 320 on either Social Network A or Social Network B, in response to Robin's request 260 Adam's HMD device 100 may display Robin's holographic portal 240 in Adam's living room 300. As described in more detail below, Robin's holographic portal may comprise a visual representation of activity in a real world three dimensional environment that is associated with Robin. In the example of FIG. 4, such a third party real world three dimensional environment comprises Robin's family room 440.

With reference also to FIG. 2, in some examples a visual representation 268 of activity in Robin's family room 440 may comprise and/or be constructed using image data 270 captured by Robin's HMD device 410. In some examples, such image data 270 may additionally or alternatively comprise image data captured by the set-top computing device 424, video camera 438, and/or any other suitable image capture device.

With reference now to FIG. 3, in one example Robin's holographic portal may comprise a holographic window 330 displayed to user Adam 320 via his HMD device 100. In some examples, the HMD device 100 may display the holographic window 330 at a world-locked location in Adam's living room 300, such as above the couch 334. In other examples the holographic portal may take the form of a virtual display such as a virtual television, a virtual miniaturized billboard, a floating blimp, etc. In other examples and as described in more detail below with respect to FIG. 6, a holographic portal may comprise displaying the visual representation of activity in the third party real world three dimensional environment as a holographic representation of at least a portion of such environment that appears outside of the user's real world three dimensional environment, such as beyond a wall that appears to have been partially removed.

In some examples a holographic portal may be programmatically displayed to a user upon the determination that a request satisfies the condition(s). In other examples, the holographic portal may be displayed in response to a user command for an HMD device 100 to display the holographic portal of a selected person.

As shown in the example of FIG. 3, the holographic window 330 may be displayed without a visual representation of activity in the third party real world three dimensional environment. In this example, user Adam 320 may provide user input instructing the HMD device 100 to display in the holographic window 330 a visual representation of activity in friend Robin's family room 440. For example, user Adam may provide such input by pointing toward the holographic window 330, which gesture may be captured and recognized by HMD device 100 as an instruction to display the visual representation. Any other suitable form of user input, such as other gestures, verbal commands, eye movements, etc., also may be used.

Figure 5:
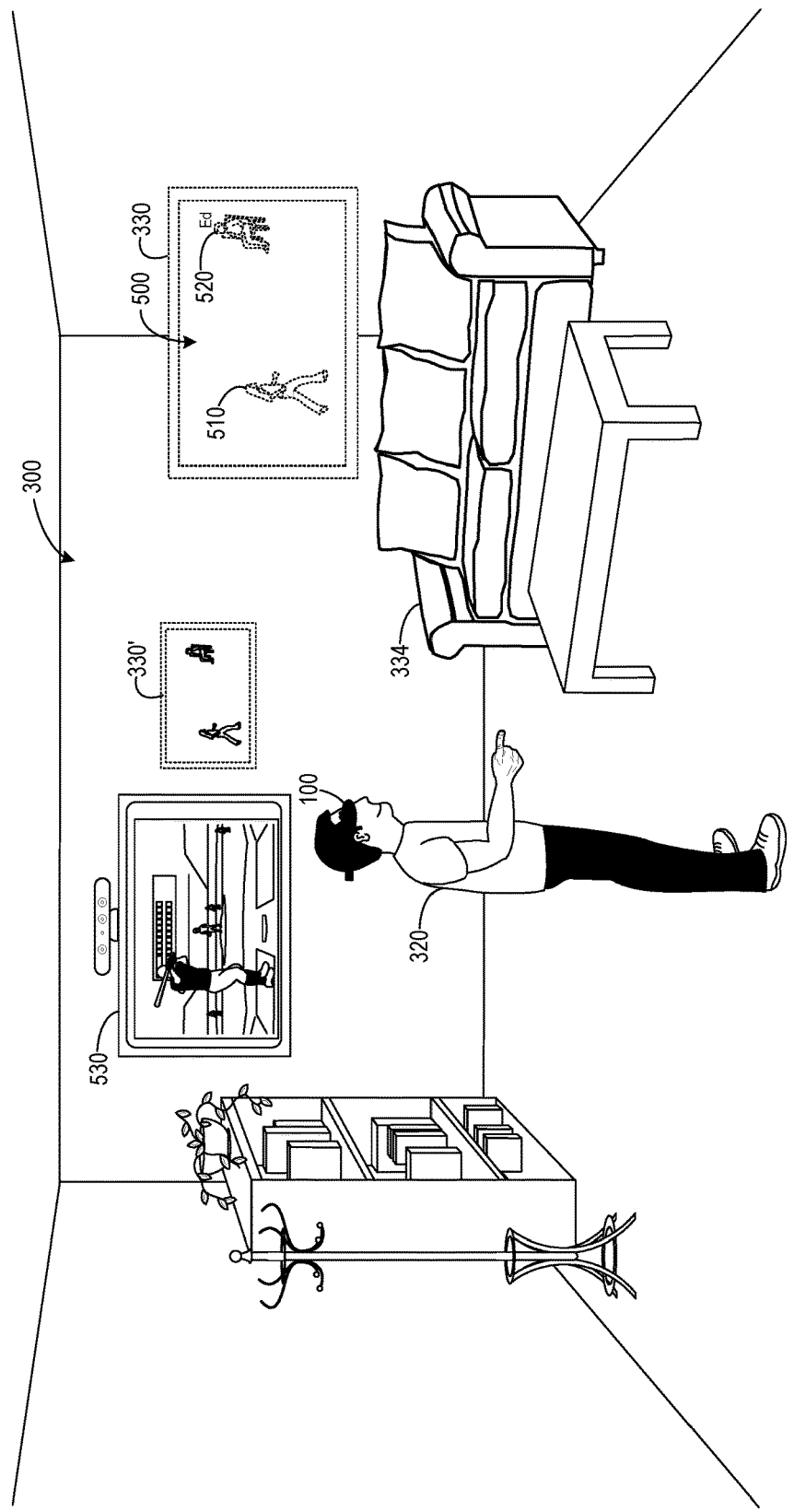
FIG. 5 shows the user of FIG. 3 viewing a visual representation of activity in the third party real world three dimensional environment of FIG. 4 according to an example of the present description.

With reference now to FIG. 5, the visual representation of activity in the third party real world three dimensional environment may comprise a current preview 500 of at least a portion of the third party real world three dimensional environment. In different examples, the visual representation may comprise varying amounts of image data from the third party real world three dimensional environment.

In the example of FIG. 5 and with reference also to FIG. 4, the current preview 500 contains a first holographic image 510 of friend Robin 420 and a second holographic image 520 of another person 450 sitting in a chair in Robin's family room 440. In this example, the other physical objects in Robin's family room 440, such as the table 454, sofa 456, flat screen television 458, etc., are not included in the current preview 500. In this manner, user Adam 320 may quickly see that his friend Robin and another person are currently in Robin's family room 440.

As schematically illustrated in FIGS. 4 and 5, the HMD device 100 may use image data from Robin's family room 440 to accurately geo-locate the first holographic image 510 and the second holographic image 520 within current preview 500 in the same locations and orientations as friend Robin 420 and the other person 450 in Robin's family room. In other words, the relative geo-locations and orientations of friend Robin 420 and the other person 450 with respect to Robin's family room 440 may be reproduced by correspondingly geo-locating and orienting the first holographic image 510 and the second holographic image 520 within current preview 500.

In some examples, holographic images in the current preview 500 may be displayed as stationary, world-locked virtual objects that comprise activity in the room. In other examples, the current preview 500 may track and display movement of people and physical objects in the room, such as friend Robin 420 walking toward the other person 450. In these examples, the current preview 500 may display to user Adam 320 a live, holographic visual representation of activity in the room, including holographic representations of Robin 420 and the other person 450 and their movements. The HMD device 100 may create a three dimensional viewing experience by displaying the holographic images at different depths as perceived by user Adam 320. In this manner, the HMD device 100 may display to user Adam 320 a three dimensional visual representation of at least a portion of the three dimensional real world environment of Robin's family room 440.

In some examples, a three dimensional virtual model of Robin's family room 440 may be generated using image data captured by visible light cameras and/or depth cameras, such image capture device 428, cameras in the HMD device 410, and/or cameras in the set top computing device 424. Using this image data and a three dimensional coordinate space overlaid upon the real world family room 440, a three dimensional virtual model of the room may be generated. This model may be generated by one of the foregoing devices and transmitted to user Adam's HMD device 100, or may be generated by the HMD device 100 using image data 270 received from one or more third party computing device(s) 264 as described above.

With continued reference to the example of FIG. 5, the holographic window 330 may occupy just a portion of the user's real world three dimensional environment. In this manner for example, the user may view and/or interact with the visual representation of the third party real world three dimensional environment while also keeping at least portions of the user's real world environment within the user's field of view, such as within his or her peripheral vision. Additionally, by simply shifting the user's gaze the user may quickly and easily leave the visual representation of the third party real world three dimensional environment to attend to an object or other matter in the user's real world environment, and vice versa, without any additional input or interaction with the HMD device 100.

In some examples user Adam 320 may provide user input to HMD device 100 that designates a world-locked location in his living room 300 as the real world location where the holographic window 330 portal is to be displayed. For example, user Adam 320 may verbally state "Put Robin's portal over the couch", which command may be recognized by voice recognition components in the HMD device 100 and correspondingly executed. Once the holographic window 330 is displayed, user Adam 320 may move the location of the window within the living room 300. To move the window he may use voice commands, physical gestures, eye gaze inputs, or any other suitable user input to the HMD device 100.

In one example, user Adam 320 may be watching his favorite baseball team on the television 530. To help him keep a close eye on the game, he may move the holographic window 330 from over the couch 334 to a location next to the television 530. In this manner, he may monitor the game and easily glance to the current preview 500 of activity in Robin's family room by a slight shift of his gaze. In some examples and as described in more detail below, user Adam 320 also may interact with friend Robin 420 and/or the other person 450 via the holographic window 330.

In some examples user Adam 320 may provide scaling input to the HMD device 100 to increase or decrease a size of the holographic window in the room 300. Such scaling input may take the form of physical gestures, such as pinch commands, voice commands, or any other suitable user input. In the example of FIG. 5, user Adam 320 may relocate the holographic window from over the couch 334 to a position next to the television 530, and may decrease its size to an adjusted holographic window 330'.

With reference again to FIG. 2, in some examples the third party holographic portal may comprise a notification 280 that certain activity in the third party real world three dimensional environment is occurring or has occurred. In one example, the notification 280 may comprise an alert that content of the third party real world three dimensional environment has been updated since the user last visited the third party real world three dimensional environment. For example and with reference again to FIG. 3, user Adam 320 may have last viewed a visual representation of activity in friend Robin's family room 440 yesterday at 9:30 μm. After that viewing, user Adam 320 instructed the HMD device 100 to cease displaying visual representation of activity in friend Robin's family room 440.

As shown in the example of FIG. 3, based on content being updated in friend Robin's family room after 9:30 μm yesterday, the portal program 200 may cause HMD device 100 to display an update notification 340 within holographic window 330 that alerts user Adam that content in Robin's family room has been updated since he last viewed the room. In this example the update notification 340 comprises the word "Update!" displayed in the holographic window 330. In other examples an update notification may be provided by displaying different words, an alert icon such as a flashing symbol, or any other suitable visual indicator. In other examples an audible or haptic alert may be used for an update notification.

In some examples, updated content may comprise a person entering or leaving Robin's family room 440, a physical or virtual object being introduced into the room, a physical or virtual object being removed from the room, or other content of the room being changed or modified.

With continued reference to FIG. 3, in some examples the third party holographic portal may comprise a presence notification 350 that the third party is currently present in their third party real world three dimensional environment. In the example of FIG. 3, the portal program 200 of HMD device 100 may determine that friend Robin 420 has entered her family room. In some examples, such a determination may be made using image data 270 from Robin's family room 440 and facial recognition technology that identifies Robin from her facial features. In other examples, Robin's HMD device 410 may include GPS location capabilities, and may transmit its location in Robin's family room 440 to user Adam's HMD device 100.

In this example the presence notification 350 comprises the words "Robin's in her room!" displayed in the holographic window 330. As with the update notification, in other examples a presence notification 350 may be provided by displaying different words, an alert icon such as a flashing symbol, or any other suitable visual indicator. In other examples an audio or haptic alert may be used for a presence notification.

In some examples, a presence notification may comprise an avatar corresponding to the third party. With continued reference to FIG. 3, in one example the HMD device 100 may provide a presence notification to user Adam 320 by displaying a holographic bird 360 flying in the room 300. In this example the holographic bird 360 comprises an avatar that corresponds to Adam's friend Robin (also a bird name). In this manner, when user Adam 320 sees the holographic bird 360, he is reminded of his friend Robin and is alerted that Robin is present in her family room 440. If desired, user Adam 320 may then control the holographic window 330 to display a visual representation of activity in Robin's family room 440 as described above. In one example, user Adam 320 may select the holographic bird 360 via gesture, audible command, etc., to trigger the holographic window 330 to display a visual representation of activity in Robin's family room 440.

It will be appreciated that a variety of different avatars that correspond to a third party may be used to alert user Adam 320 that the third party is currently present in their third party real world three dimensional environment. For example and again with reference to FIG. 3, user Adam 320 may have a close friend Frank whose nickname was "Tank" on their college soccer team. A holographic tank 370 may be displayed in user Adam's living room 300 to alert Adam that Frank is currently present in a real world three dimensional environment associated with Frank, such as his media room.

As described above, in some examples a third party holographic portal 240 may take the form of a holographic window 330 that displays a visual representation of activity in a third party real world three dimensional environment that is associated with the third party. In other examples, a third party holographic portal 240 may comprise a user-defined location or volume of space in the user's real world three dimensional environment. With reference to FIG. 5, in one example the third party holographic portal 240 may comprise a volume of space above the couch 334 in the general location of the holographic window 330. In this example the holographic window 330 may not be visible to user Adam 320, while the first holographic image 510 of friend Robin and a second holographic image 520 of another person 450 are displayed in the space above the couch 334.

Figure 6:
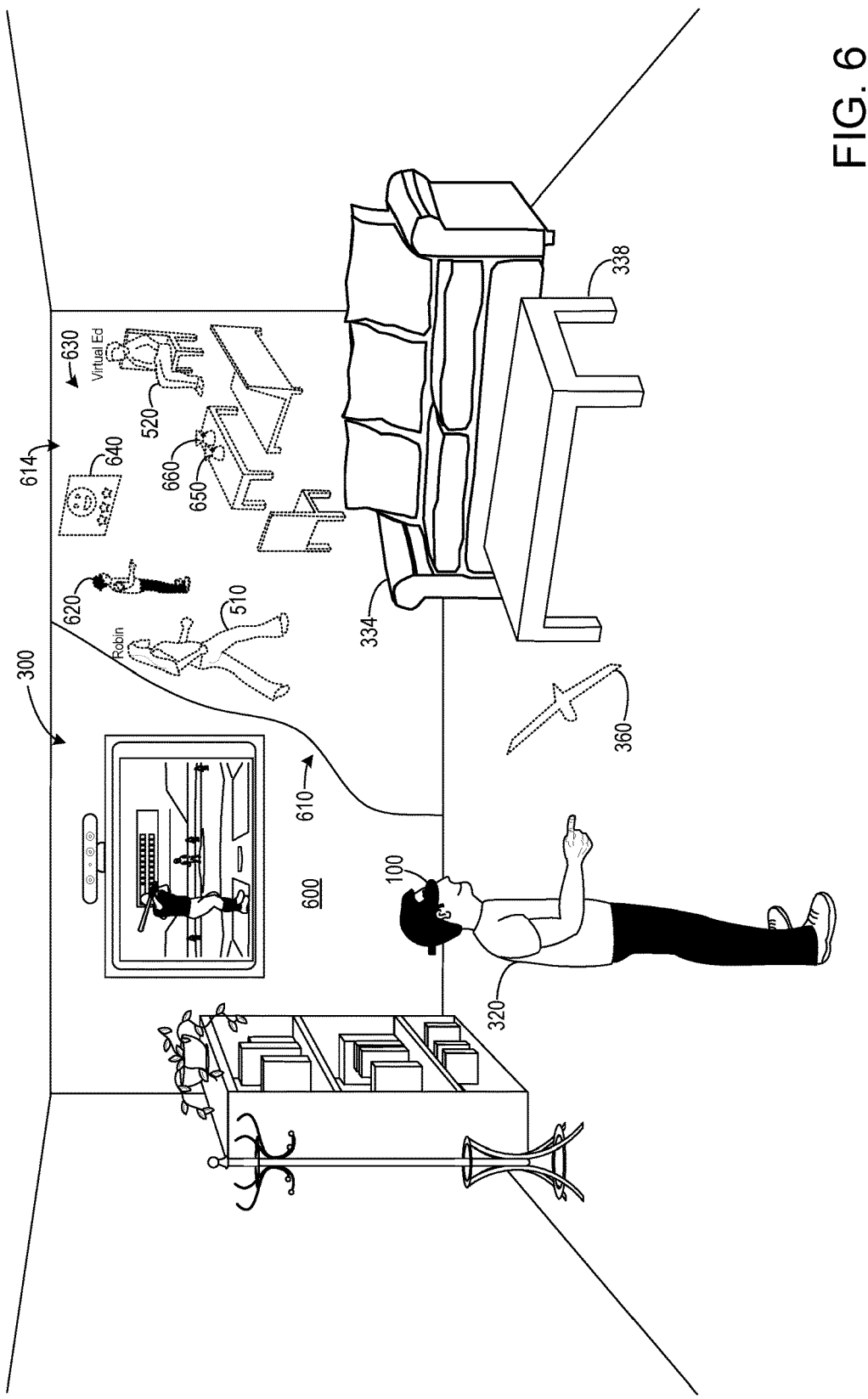
FIG. 6 shows the user of FIG. 3 viewing a visual representation of activity in the third party real world three dimensional environment of FIG. 4 according to another example of the present description.

In some examples and as noted above, the third party holographic portal may comprise displaying the visual representation of activity in the third party real world three dimensional environment as a holographic representation of at least a portion of such environment that appears outside of the user's real world three dimensional environment, such as beyond a wall that appears to have been partially removed. With reference now to FIG. 6, in one example user Adam 320 may select the holographic bird 360 corresponding to his friend Robin, such as by pointing at the bird. In response to this selection, the HMD device 100 may cause user Adam 320 to perceive that a wall 600 of user Adam's living room 300 is partially torn away as indicated at 610. The HMD device 100 may display a holographic visual representation 630 of a portion of friend Robin's family room 440 beyond the room 300, as if it were located behind wall 600 in an adjacent room. In this manner, the holographic portal may comprise the portion 614 of the wall 600 that has been virtually removed, and user Adam 320 may enjoy an augmented reality experience in which friend Robin's family room 440 appears adjacent to his living room 300.

In other examples, a third party holographic portal may be displayed on or over other real world three dimensional objects in user Adam's living room 300, such as a pillow of couch 334, the coffee table 338, etc.

In some examples, a holographic representation of user Adam 320 may be displayed within the visual representation of activity in a third party real world three dimensional environment. With continued reference to FIG. 6, in one example a holographic avatar 620 of user Adam 320 may be displayed by HMD device 100 within the visual representation 630 of friend Robin's family room. User Adam 320 may move his avatar 620 via input to the HMD device 100, such as by gesturing with his hands, moving his head, walking or changing an orientation or position of his body, etc. In some examples the avatar 620 may mirror the movements of user Adam 320, as illustrated in the example of FIG. 6. Audio may be shared between the rooms. In this manner, the HMD device 100 and portal program 200 may provide user Adam 320 with an augmented reality experience in his living room 300 that includes virtually interacting with a holographic image 510 of his friend Robin 420 in a holographic visual representation 630 of Robin's family room 440 that appears to be next to Adam's living room.

In some examples, a visual representation of activity in a third party real world three dimensional environment may comprise an identification 284 of at least one person other than the third party who is physically or virtually present in the third party real world three dimensional environment. With reference again to FIG. 5, the second holographic image 520 within the current preview 500 may correspond to another person named Ed. User Adam's HMD device 100 may identify Ed via facial recognition, identifying data transmitted from a computing device associated with Ed, or other suitable methods. Upon identifying Ed, the HMD device 100 may display "Ed" adjacent to the holographic image 520 of this person. In this manner, user Adam 320 may be apprised of others who are present in friend Robin's family room 440 before deciding whether to virtually interact with the people in the room.

In some examples, a visual representation of activity in a third party real world three dimensional environment may be displayed to a user without notifying the third party that the user is viewing the visual representation. For example and with reference again to FIG. 5, user Adam 320 may view the current preview 500 of activity in friend Robin's family room without notifying Robin. In this manner, user Adam 320 may view the activity in Robin's family room before deciding whether to interact with Robin or others physically or virtually present in the room. For example, user Adam 320 may see that Ed is currently in the room with Robin. User Adam 320 may dislike Ed. Accordingly, when user Adam 320 sees that Ed is present in friend Robin's family room, Adam may decide to refrain from interacting with Robin at this time and from making his presence known.

In some examples, the third party may be notified when a user is viewing a visual representation of activity in the third party's real world three dimensional environment. For example and with reference to FIG. 4, when user Adam 320 is viewing a visual representation of activity Robin's family room 440, Robin's HMD device 410 may display a holographic eye 460 floating in her room.

With reference again to FIG. 4, in some examples holographic objects and/or holographic persons may be geo-located in friend Robin's family room 440. For example, friend Robin 420 may have created a holographic poster 470 that she has geo-located in a world-locked position in her family room 440. Robin 420 also may be an avid gamer, and may have earned two holographic bags of gold 474 and 478 that she is virtually displaying in a world-locked location on her coffee table 480.

With reference again to the example of FIG. 6, in some examples the visual representation 630 of activity in Robin's family room 440 displayed via user Adam's HMD device 100 may comprise a holographic image 640 of the holographic poster 470 and two holographic images 650 and 660 of the holographic bags of gold 474 and 478 in their geo-located, world-locked locations in the family room 440. In this manner, friend Robin 420 may share and user Adam 320 may view holographic objects that friend Robin 420 or others have geo-located in Robin's family room 440.

In some examples, holographic avatars of one or more persons may be geo-located in Robin's family room 440. With reference to FIG. 6, in one example the person Ed 450 may not be physically present in Robin's family room 440, but a holographic avatar of Ed may be geo-located in the room. In this example and as illustrated in FIG. 6, user Adam's HMD device 100 may display the holographic image 520 of Ed along with the identification "Virtual Ed" to convey to Adam that a holographic avatar of Ed is geo-located in the room, as opposed to the actual person of Ed being present.

Figure 7A:
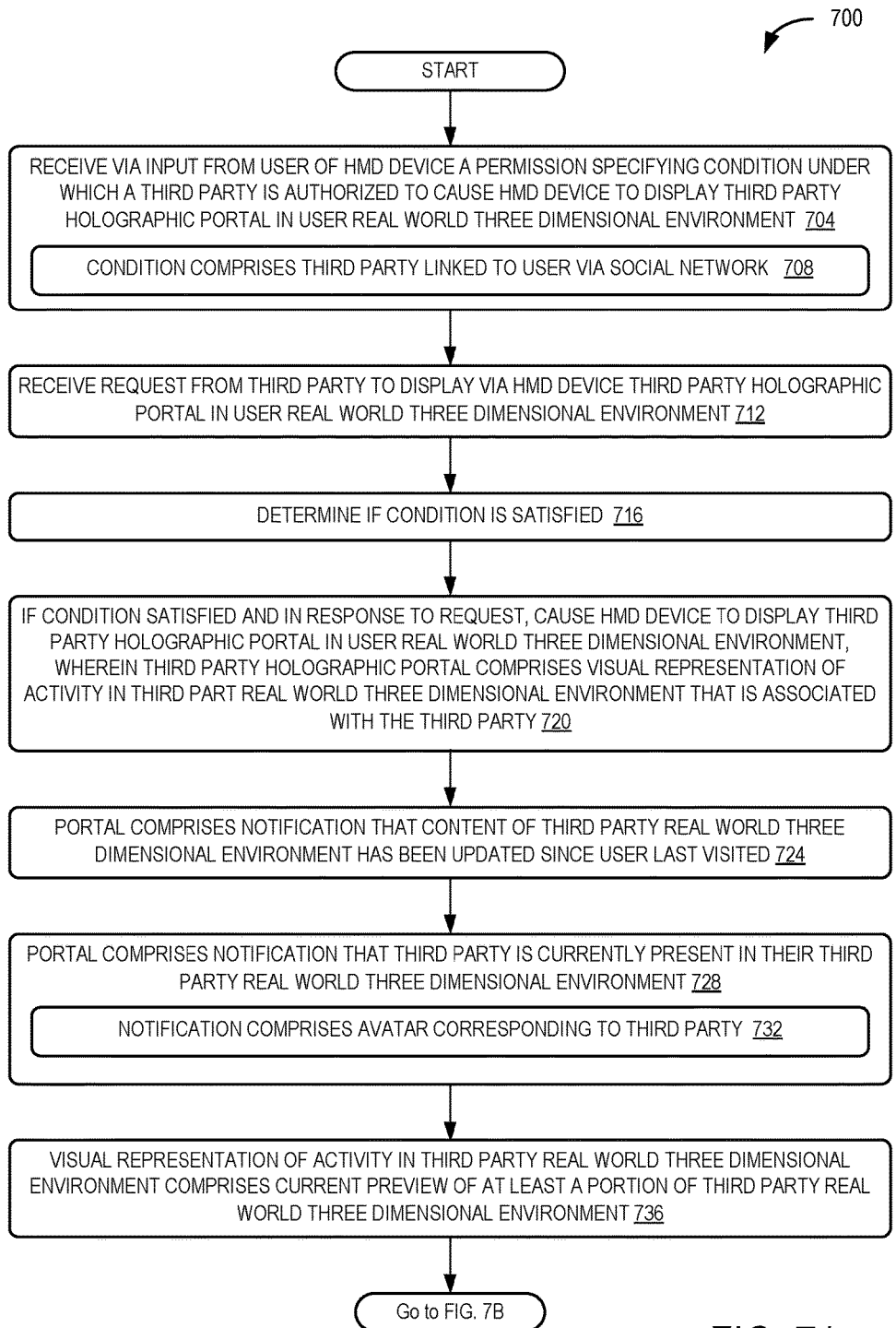
FIGS. 7A and 7B are a flow chart of a method for displaying a third party holographic portal in a user real world three dimensional environment according to an example of the present description.
Figure 7B:
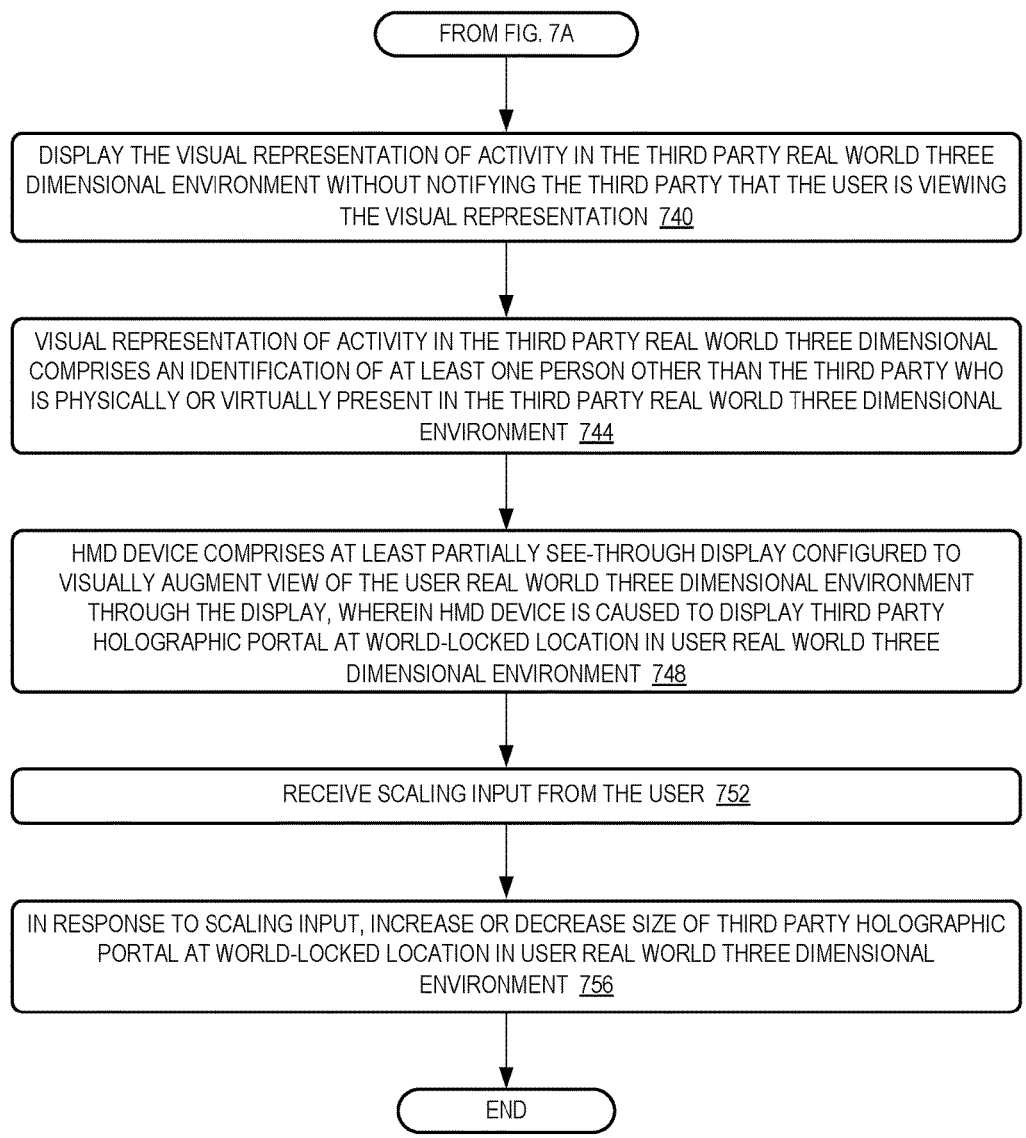

FIGS. 7A and 7B illustrate a flow chart of a method 700 for displaying via a head-mounted display device a third party holographic portal in a user real world three dimensional environment according to an example of the present disclosure. The following description of method 700 is provided with reference to the software and hardware components described above and shown in FIGS. 1-6. It will be appreciated that method 700 also may be performed in other contexts using other suitable hardware and software components.

With reference to FIG. 7A, at 704 the method 700 may include receiving via input from a user of a head-mounted display device a permission specifying a condition under which a third party is authorized to cause the head-mounted display device to display a third party holographic portal in the user real world three dimensional environment. At 708 the condition may comprise that the third party is linked to the user via a social network. At 712 the method 700 may include receiving a request from the third party to display via the head-mounted display device the third party holographic portal in the user real world three dimensional environment. At 716 the method 700 may include determining if the condition is satisfied.

At 720 the method 700 may include, if the condition is satisfied and in response to the request, causing the head-mounted display device to display the third party holographic portal in the user real world three dimensional environment, wherein the third party holographic portal comprises a visual representation of activity in a third party real world three dimensional environment that is associated with the third party. At 724 the third party holographic portal may comprise a notification that content of the third party real world three dimensional environment has been updated since the user last visited the third party real world three dimensional environment.

At 728 the third party holographic portal may comprise a notification that the third party is currently present in their third party real world three dimensional environment. At 732 the notification may comprise an avatar corresponding to the third party. At 736 the visual representation of activity in the third party real world three dimensional environment may comprise a current preview of at least a portion of the third party real world three dimensional environment.

With reference now to FIG. 7B, at 740 the method 700 may include displaying the visual representation of activity in the third party real world three dimensional environment without notifying the third party that the user is viewing the visual representation. At 744 the visual representation of activity in the third party real world three dimensional environment may comprise an identification of at least one person other than the third party who is physically or virtually present in the third party real world three dimensional environment.

At 748 the head-mounted display device may comprise an at least partially see-through display configured to visually augment a view of the user real world three dimensional environment through the display, and the head-mounted display device may be caused to display the third party holographic portal at a world-locked location in the user real world three dimensional environment. At 752 the method 700 may include receiving scaling input from the user. At 756 the method 700 may include, in response to the scaling input, increasing or decreasing a size of the third party holographic portal at the world-locked location in the user real world three dimensional environment.

It will be appreciated that method 700 is provided by way of example and is not meant to be limiting. Therefore, it is to be understood that method 700 may include additional and/or alternative steps relative to those illustrated in FIGS. 7A and 7B. Further, it is to be understood that method 700 may be performed in any suitable order. Further still, it is to be understood that one or more steps may be omitted from method 700 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
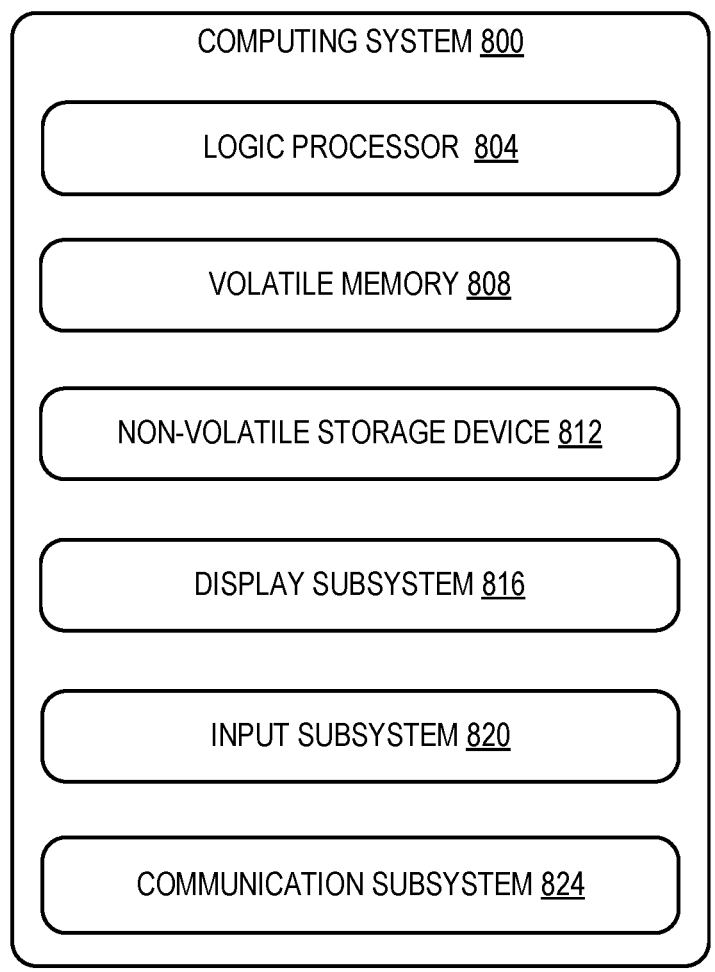
FIG. 8 shows a computing system according to an embodiment of the present description.

FIG. 8 schematically shows a non-limiting embodiment of a computing system 800 that can enact one or more of the methods and processes described above. Computing system 800 is shown in simplified form. Computing system 800 may take the form of one or more head-mounted display devices as shown in FIG. 1, or one or more devices communicatively coupled with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 800 includes a logic processor 804, volatile memory 808, and a non-volatile storage device 812. Computing system 800 may optionally include a display subsystem 816, input subsystem 820, communication subsystem 824, and/or other components not shown in FIG. 8.

Logic processor 804 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 804 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 808 may include physical devices that include random access memory. Volatile memory 808 is typically utilized by logic processor 804 to temporarily store information during processing of software instructions. It will be appreciated that volatile memory 808 typically does not continue to store instructions when power is cut to the volatile memory 808.

Non-volatile storage device 812 includes one or more physical devices configured to hold instructions executable by the logic processors to implement the methods and processes described herein. When such methods and processes are implemented, the state of non-volatile storage device 812 may be transformed e.g., to hold different data.

Non-volatile storage device 812 may include physical devices that are removable and/or built-in. Non-volatile storage device 812 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 812 may include nonvolatile, dynamic, static, read/write, read-only, sequential-access, location-addressable, file-addressable, and/or content-addressable devices. It will be appreciated that non-volatile storage device 812 is configured to hold instructions even when power is cut to the non-volatile storage device 812.

Aspects of logic processor 804, volatile memory 808, and non-volatile storage device 812 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 implemented to perform a particular function. In some cases, a program may be instantiated via logic processor 804 executing instructions held by non-volatile storage device 812, using portions of volatile memory 808. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 816 may be used to present a visual representation of data held by non-volatile storage device 812. As the herein described methods and processes change the data held by the non-volatile storage device, and thus transform the state of the non-volatile storage device, the state of display subsystem 816 may likewise be transformed to visually represent changes in the underlying data. Display subsystem 816 may include one or more display devices utilizing virtually any type of technology. Such display devices may be combined with logic processor 804, volatile memory 808, and/or non-volatile storage device 812 in a shared enclosure, or such display devices may be peripheral display devices. With respect to the example HMD device 100 of FIG. 1, the display panels 104R and 104L configured to visually augment an appearance of a real-world, three dimensional physical environment by displaying virtual objects such as holograms are an example of a display subsystem 816.

When included, input subsystem 820 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; any of the sensors described above with respect to HMD device 100; and/or any other suitable sensor.

When included, communication subsystem 824 may be configured to communicatively couple computing system 800 with one or more other computing devices. Communication subsystem 824 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides a method for displaying via a head-mounted display device a third party holographic portal in a user real world three dimensional environment, the method comprising: receiving via input from a user of the head-mounted display device a permission specifying a condition under which a third party is authorized to cause the head-mounted display device to display the third party holographic portal in the user real world three dimensional environment; receiving a request from the third party to display via the head-mounted display device the third party holographic portal in the user real world three dimensional environment; determining if the condition is satisfied; and if the condition is satisfied and in response to the request, causing the head-mounted display device to display the third party holographic portal in the user real world three dimensional environment, wherein the third party holographic portal comprises a visual representation of activity in a third party real world three dimensional environment that is associated with the third party. The method may additionally or optionally include, wherein the condition comprises that the third party is linked to the user via a social network. The method may additionally or optionally include, wherein the third party holographic portal comprises a notification that content of the third party real world three dimensional environment has been updated since the user last visited the third party real world three dimensional environment. The method may additionally or optionally include, wherein the third party holographic portal comprises a notification that the third party is currently present in their third party real world three dimensional environment. The method may additionally or optionally include, wherein the notification comprises an avatar corresponding to the third party. The method may additionally or optionally include, wherein the visual representation of activity in the third party real world three dimensional environment comprises a current preview of at least a portion of the third party real world three dimensional environment. The method may additionally or optionally include displaying the visual representation of activity in the third party real world three dimensional environment without notifying the third party that the user is viewing the visual representation. The method may additionally or optionally include, wherein the visual representation of activity in the third party real world three dimensional environment comprises an identification of at least person other than the third party who is physically or virtually present in the third party real world three dimensional environment. The method may additionally or optionally include, wherein the head-mounted display device comprises an at least partially see-through display configured to visually augment a view of the user real world three dimensional environment through the display, wherein the head-mounted display device is caused to display the third party holographic portal at a world-locked location in the user real world three dimensional environment. The method may additionally or optionally include, receiving scaling input from the user; and in response to the scaling input, increasing or decreasing a size of the third party holographic portal in the user real world three dimensional environment.

Another aspect provides a head-mounted display device, comprising: an at least partially see-through display; a processor; and a memory holding instructions executable by the processor to: receive from a user a permission specifying a condition under which a third party is authorized to cause the head-mounted display device to display a third party holographic portal in a user real world three dimensional environment; receive a request from the third party to display the third party holographic portal in the user real world three dimensional environment; determine if the condition is satisfied; and if the condition is satisfied and in response to the request, cause the at least partially see-through display to display the third party holographic portal in the user real world three dimensional environment, wherein the third party holographic portal comprises a visual representation of activity in a third party real world three dimensional environment that is associated with the third party. The head-mounted display device may additionally or alternatively include, wherein the condition comprises that the third party is linked to the user via a social network. The head-mounted display device may additionally or alternatively include, wherein the third party holographic portal comprises a notification that content of the third party real world three dimensional environment has been updated since the user last visited the third party real world three dimensional environment. The head-mounted display device may additionally or alternatively include, wherein the third party holographic portal comprises a notification that the third party is currently present in their third party real world three dimensional environment. The head-mounted display device may additionally or alternatively include, wherein the notification comprises an avatar corresponding to the third party. The head-mounted display device may additionally or alternatively include, wherein the visual representation of activity in the third party real world three dimensional environment comprises a current preview of at least a portion of the third party real world three dimensional environment. The head-mounted display device may additionally or alternatively include, wherein the instructions are executable by the processor to display the visual representation of activity in the third party real world three dimensional environment without notifying the third party that the user is viewing the visual representation. The head-mounted display device may additionally or alternatively include, wherein the visual representation of activity in the third party real world three dimensional environment comprises an identification of at least one person other than the third party who is physically or virtually present in the third party real world three dimensional environment. The head-mounted display device may additionally or alternatively include, wherein the instructions are executable by the processor to display the third party holographic portal at a world-locked location in the user real world three dimensional environment.

Another aspect provides a head-mounted display device, comprising: an at least partially see-through display; a processor; and a memory holding instructions executable by the processor to: receive from a user a permission specifying a condition that a third party is linked to the user via a social network; receive a request from the third party to cause the at least partially see-through display to display a third party holographic portal in a user real world three dimensional environment; determine if the third party is linked to the user via the social network; and if the third party is linked to the user via the social network and in response to the request, cause the at least partially see-through display to display the third party holographic portal in the user real world three dimensional environment at a world-locked location, wherein the third party holographic portal comprises a visual representation of activity in a third party real world three dimensional environment that is associated with the third party.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for displaying via a head-mounted display device a third party holographic portal in a user real world three dimensional environment, the method comprising:
    receiving via input from a user of the head-mounted display device a permission specifying a condition under which a third party is authorized to cause the head-mounted display device to display the third party holographic portal in the user real world three dimensional environment;
    receiving image data from a third party real world three dimensional environment that is associated with the third party;
    receiving a request from the third party to display via the head-mounted display device the third party holographic portal in the user real world three dimensional environment;
    determining if the condition is satisfied;
    if the condition is satisfied and in response to the request, causing the head-mounted display device to display the third party holographic portal in the user real world three dimensional environment at a world-locked location, wherein the third party holographic portal comprises a visual representation of activity in the third party real world three dimensional environment, wherein the visual representation of activity comprises a holographic avatar of the third party, a holographic avatar of at least one person other than the third party who is present in the third party real world three dimensional environment, and identification data that identifies the at least one person;
    using the image data received from the third party real world three dimensional environment, geo-locating and orienting the holographic avatar of the third party and the holographic avatar of the at least one person other than the third party in a manner that reproduces relative geo-locations and orientations of the third party and the at least one other person in the third party real world three dimensional environment; and
    prior to displaying the visual representation of activity, outputting via the head-mounted display device a notification of the activity in the third party real world three dimensional environment.

2. The method of claim 1, wherein the condition comprises that the third party is linked to the user via a social network.

3. The method of claim 1, wherein the notification comprises a notification that content of the third party real world three dimensional environment has been updated since the user last visited the third party real world three dimensional environment.

4. The method of claim 1, wherein the notification comprises a notification that the third party is currently present in their third party real world three dimensional environment.

5. The method of claim 4, wherein the notification that the third party is currently present comprises an avatar corresponding to the third party.

6. The method of claim 1, wherein the visual representation of activity in the third party real world three dimensional environment comprises a current preview of at least a portion of the third party real world three dimensional environment.

7. The method of claim 1, further comprising displaying the visual representation of activity in the third party real world three dimensional environment without notifying the third party that the user is viewing the visual representation.

8. The method of claim 1, further comprising:
    receiving scaling input from the user; and
    in response to the scaling input, increasing or decreasing a size of the third party holographic portal in the user real world three dimensional environment.

9. A head-mounted display device, comprising:
    an at least partially see-through display;
    a processor; and
    a memory holding instructions executable by the processor to:
        receive from a user a permission specifying a condition under which a third party is authorized to cause the head-mounted display device to display a third party holographic portal in a user real world three dimensional environment;

receive image data from a third party real world three dimensional environment that is associated with the third party;

receive a request from the third party to display the third party holographic portal in the user real world three dimensional environment;

determine if the condition is satisfied;

if the condition is satisfied and in response to the request, cause the at least partially see-through display to display the third party holographic portal in the user real world three dimensional environment at a world-locked location, wherein the third party holographic portal comprises a visual representation of activity in the third party real world three dimensional environment, wherein the visual representation of activity comprises a holographic avatar of the third party, a holographic avatar of at least one person other than the third party who is present in the third party real world three dimensional environment, and identification data that identifies the at least one person;

using the image data received from the third party real world three dimensional environment, geo-locate and orient the holographic avatar of the third party and the holographic avatar of the at least one person other than the third party in a manner that reproduces relative geo-locations and orientations of the third party and the at least one other person in the third party real world three dimensional environment; and prior to displaying the visual representation of activity, outputting via the head-mounted display device a notification of the activity in the third party real world three dimensional environment.

10. The head-mounted display device of claim 9, wherein the condition comprises that the third party is linked to the user via a social network.

11. The head-mounted display device of claim 9, wherein the notification comprises a notification that content of the third party real world three dimensional environment has been updated since the user last visited the third party real world three dimensional environment.

12. The head-mounted display device of claim 9, wherein the notification comprises a notification that the third party is currently present in their third party real world three dimensional environment.

13. The head-mounted display device of claim 12, wherein the notification that the third party is currently present comprises an avatar corresponding to the third party.

14. The head-mounted display device of claim 9, wherein the visual representation of activity in the third party real world three dimensional environment comprises a current preview of at least a portion of the third party real world three dimensional environment.

15. The head-mounted display device of claim 9, wherein the instructions are executable by the processor to display the visual representation of activity in the third party real world three dimensional environment without notifying the third party that the user is viewing the visual representation.

16. A head-mounted display device, comprising:

an at least partially see-through display;

a processor; and a memory holding instructions executable by the processor to:

receive from a user a permission specifying a condition that a third party is linked to the user via a social network;

receive image data from a third party real world three dimensional environment that is associated with the third party receive a request from the third party to cause the at least partially see-through display to display a third party holographic portal in a user real world three dimensional environment;

determine if the third party is linked to the user via the social network; and if the third party is linked to the user via the social network and in response to the request, cause the at least partially see-through display to display the third party holographic portal in the user real world three dimensional environment at a world-locked location, wherein the third party holographic portal comprises a visual representation of activity in the third party real world three dimensional environment, wherein the visual representation of activity comprises a holographic avatar of the third party, a holographic avatar of at least one person other than the third party who is present in the third party real world three dimensional environment, and identification data that identifies the at least one person;

using the image data received from the third party real world three dimensional environment, geo-locate and orient the holographic avatar of the third party and the holographic avatar of the at least one person other than the third party in a manner that reproduces relative geo-locations and orientations of the third party and the at least one other person in the third party real world three dimensional environment; and prior to displaying the visual representation of activity, outputting via the head-mounted display device a notification of the activity in the third party real world three dimensional environment.

* * * * *